Patented Oct. 7, 1947

2,428,766

UNITED STATES PATENT OFFICE 2,428,766

PRODUCTION OF GLYCEROL AND YEAST BY FERMENTATION

Arthur L. Schade, New York, N. Y., assignor to The Overly Biochemical Research Foundation, Inc., New York, N. Y., a corporation of New York No Drawing. Application July 29, 1943, Serial No. 496,591

5 Claims. (Cl. 195—38)

My invention relates to the fermentation of carbohydrate material which is fermentable with yeast.

It is the general object of the invention to provide an improved yeast fermentation process wherein the normal course of the alcoholic fermentation is altered by providing measures for the removal of at least part of the more volatile products of the fermentation as they are formed, while maintaining the pH value of the fermenting mash within the range of about 6.9 to 7.3.

More specifically, it is an object of the invention to provide a process for the manufacture of glycerine by fermentation of carbohydrate material whereby high yields of glycerine are obtained with relatively short periods of fermentation.

I have found that if the fermentation of carbohydrate material, and particularly of carbohydrate solutions obtained by the hydrolysis of cereals, like wheat, corn, oats, etc., and also of other starchy materials, like potatoes, or of industrial carbohydrate materials, like molasses, is conducted under substantially neutral conditions, that is, within a pH range of about 6.9 to 7.3, and if the more volatile products of the fermentation, like carbon dioxide, alcohol, and acetaldehyde are at least in part removed continuously as they are formed, the production of ethyl alcohol is reduced in favor of more valuable products like glycerine, the yield of glycerine being particularly promoted by the removal of the said volatile products. The pH value of the solution is carefully controlled by regulating the feed of a suitable neutralizing agent into the fermenting mash. Such suitable neutralizing agents include the hydroxides, alkaline-reacting phosphates, and carbonates of the alkali metals, and likewise, the hydroxides of the alkaline earth metals, including the hydroxide of magnesium. The more volatile products of the fermentation are continuously expelled as they are formed. One way of doing this is by bubbling a neutral gas like air or nitrogen through the mash; another way of accomplishing this result is by the application of vacuum. It is of advantage to provide the fermentation vat with a mechanical stirrer to insure intimate and continuous contact between the reacting materials.

It is known to produce glycerine by fermenting carbohydrates with yeast in the presence of an alkalizing agent. The latter acts as a steering agent which causes the fermentation to deviate from the normal course, in which alcohol is the main product, to a more complex reaction in which a considerable part of the fermentable carbohydrate is converted into glycerine.

It is also known that increase in the alkalinity of the fermenting mash favors increase in the yield of glycerine (Lawrie, "Glycerol and the Glycols", page 118, The Chemical Catalog Company, Inc., New York, 1928); on the other hand, the yield and activity of the yeast fall with increase of alkalinity.

In accordance with the present invention, yields of glycerine of the order of those obtained with relatively highly alkaline mashes are produced by conducting the fermentation continuously at as nearly neutral conditions as it is possible to maintain on a commercial scale, and by passing a stream of gas through the mash during the fermentation. In addition to the high yield of glycerine, I thereby obtain also a high yield of yeast in such an active state that no treatment thereof is required prior to re-use.

The amount of neutralizing agent that must be added per unit time will, of course, depend upon the rate at which carbon dioxide and acetic acid are produced by the fermentation; and similarly, the rate of feed of gas, or the degree of vacuum applied, will likewise depend upon the rate at which the fermentation proceeds.

If air is used as the gas, the yeast grows considerably, even severalfold, during the fermentation. In any case, whatever suitable gas is used in the process, the yeast is maintained in a healthy state so that it is capable of being utilized again to ferment fresh amounts of carbohydrates according to the present process.

The volatilized materials entrained with the stream of introduced gas can be recovered by passing the gas through scrubbers in which the gas is washed with liquids absorbing the volatilized organic materials, like alcohol and acetaldehyde. It is also possible to use adsorbent solid materials like adsorbent carbon, for the recovery of these products.

The fermentation of solutions containing 10–20% carbohydrates under these conditions, when done in batches, is completed in about 12 hours to 1 day at the temperatures usual for such fermentations, namely, between 34-37° C. After the fermentation is completed, the yeast is easily recovered, for example, by filtration. The filter cake containing the yeast and, depending upon the neutralizing agent employed, the insoluble carbonate, can be utilized directly to ferment new amounts of carbohydrates.

*Example 1.*—A regular fermentation mash is prepared by hydrolyzing wheat according to one of the customary methods. The solution then contains 10% of total reducing sugar. 10 liters of the solution corresponding to 1000 grams of total reducing sugars and 100 grams of a pressed yeast containing approximately 72% water, are placed in a fermenting vat equipped with stirrer, gas disperser, and gas outlets, in a constant temperature room of approximately 32° C. Air is passed into this mixture at a rate of approximately 1 liter per minute. The gas outlet is connected with scrubbing towers in which first water and then sodium bisulfite are used for washing out alcohol and aldehyde from the gas. The pH during the fermentation is maintained at 6.9 to 7.3 by, preferably continuous, addition of a 5% solution of sodium hydroxide.

After 12 hours all of the fermentable sugar (795 grams) has been used up. Filtration yields a filter cake in which approximately 310 grams of yeast on the basis of about 72% water in the yeast are present. Approximately 10% of the total reducing sugar has been utilized for the production of the additional amount of yeast. The filtrate, after concentrating, gives a distillate containing about 150 grams of pure glycerine which amounts to approximately 22% of the sugar used for this fermentation.

*Example 2.*—The same procedure as outlined in Example 1 was followed except that nitrogen was used for driving off the more volatile products of the fermentation. With nitrogen, the growth of yeast was somewhat less, while the yield of glycerine was likewise somewhat smaller than in Example 1.

*Example 3.*—The procedure described in Example 1 was followed except that a 45% calcium hydroxide slurry was used to maintain the neutrality of the fermenting wheat hydrolysate, the slurry being continuously charged into the fermenting vat after the fermentation had begun. The results were similar to those obtained by the process of Example 1. Approximately 9% of the sugar consumed went into the formation of the yeast. The glycerine yield upon the basis of the sugar fermented amounted to 25%. The acetic acid produced corresponded to about 10% of the fermented sugar, while the ethyl alcohol corresponded to 23%. The speed of the fermentation was as high as that obtained by the use of sodium hydroxide as in Example 1.

*Example 4.*—The same procedure as outlined in Example 3 was followed except that blackstrap molasses was used as the source of carbohydrates for the fermentation. From 494 grams of sugar metabolized during the fermentation, 110 grams of glycerine were produced. This represents a yield of 22% calculated on the basis of sugar metabolized.

In place of sodium and calcium hydroxides employed in the above examples, the hydroxides of strontium, barium, and magnesium, the carbonates of sodium and potassium, and the alkaline-reacting phosphates of sodium and potassium, like disodium phosphate, may be used to effect neutralization of the fermenting mash.

While certain organic bases capable of neutralizing the fermenting mash, might be suitable, from the practical standpoint, particularly because of their higher cost and difficulty of recovery, they are of no significance.

If desired, the gas, after being scrubbed, can be re-circulated through the mash and in such case, it will not be necessary to have the scrubbers operate at the highest possible efficiency. To avoid the accumulation of too large an amount of carbonate in the fermenting mash, which may interfere with the efficient recovery of glycerine, it is desirable in such event to scrub out the carbon dioxide content of the gas before re-charging it into the fermentation vat.

I claim:

1. The method of producing glycerine and yeast by fermentation of carbohydrates with yeast, which comprises adding about 100 grams of a pressed yeast containing approximately 72% water to 10 liters of a hydrolysate of a starchy material containing about 10% of total reducing sugar, conducting the fermentation at fermentation temperature while passing air through the mixture, maintaining the fermenting mixture in the neutral range by continuously neutralizing the acidic substances formed during the fermentation by means of a corresponding proportion of a base, and continuing the fermentation until substantially all of the fermentable sugar has been consumed, whereby a yield of approximately 22% of glycerine based on the fermented sugar, and approximately 310 grams of yeast with a 72% water content are obtained.

2. The method of producing glycerine and yeast by fermentation of carbohydrates with yeast, which comprises adding yeast to a wheat hydrolysate containing about 10% of total reducing sugars, allowing the mixture to ferment at fermenting temperature while passing air through the mixture, and neutralizing the formed acidic substances substantially as quickly as they are produced, by means of a corresponding proportion of a base, so as to maintain the pH during the fermentation within the neutral range.

3. The method of producing glycerine by fermenting carbohydrates with yeast, which comprises removing at least part of the volatile products of a yeast-carbohydrate fermentation, as they are formed, by passing a stream of gas through the fermenting solution, and simultaneously feeding a neutralizing agent at a controlled rate into the fermenting solution to neutralize the acidic substances formed during the fermentation so as to maintain the pH value continuously within the neutral range of 6.9 to 7.3.

4. The method of producing glycerine by fermentation of carbohydrates with yeast, which comprises removing at least part of the more volatile products of a yeast-carbohydrate fermentation by passing a stream of air through the fermenting solution, and simultaneously charging a neutralizing agent at a controlled rate continuously into the fermenting solution to neutralize the acidic substances formed during the fermentation, so as to maintain the solution within a neutral pH range of about 6.9 to 7.3.

5. The method of producing glycerine by fermenting carbohydrates with yeast, which comprises removing at least part of the volatile products of a yeast-carbohydrate fermentation, as they are formed, by passing a stream of gas through the fermenting mash while neutralizing the formed acidic substances in the fermenting mash to maintain the pH value continuously within the neutral range of 6.9 to 7.3, the neutralization being effected by means of a member of the group consisting of basic alkali metal phosphates and alkali metal and alkaline earth metal hydroxides and carbonates.

ARTHUR L. SCHADE.

REFERENCES CITED

The following references are of record in the file of this patent:

UNITED STATES PATENTS

| Number | Name | Date |
|---|---|---|
| 2,189,793 | Haehn | Feb. 13, 1940 |
| 1,425,838 | Cocking | Aug. 15, 1922 |
| 1,732,921 | Bratton | Oct. 22, 1929 |
| 1,698,800 | Luedecke | Jan. 15, 1929 |
| 1,288,398 | Eoff | Dec. 17, 1918 |

FOREIGN PATENTS

| Number | Country | Date |
|---|---|---|
| 291,146 | Great Britain | |

OTHER REFERENCES

Wahl-Henius, American Handy Book of the Brewing, Malting, and Auxiliary Trades, volume II, published by the Wahl-Henius Institute, Chicago 1908, page 1208. (Copy in Division 63.)